United States Patent [19]

Ishii

[11] Patent Number: 5,627,804
[45] Date of Patent: May 6, 1997

[54] MAGNETO-OPTICAL RECORDING APPARARTUS INCLUDING A MAGNETIC HEAD HAVING A CORE COMPOSED OF A SINGLE CRYSTAL FERRITE MATERIAL

[75] Inventor: Kazuyoshi Ishii, Tokyo, Japan

[73] Assignee: Canon Kabushiki Kaisha, Tokyo, Japan

[21] Appl. No.: 658,399

[22] Filed: Jun. 5, 1996

Related U.S. Application Data

[63] Continuation of Ser. No. 304,432, Sep. 12, 1994, abandoned, which is a continuation of Ser. No. 964,846, Oct. 22, 1992, abandoned.

[30] Foreign Application Priority Data

Oct. 28, 1991 [JP] Japan .................................. 3-307170
Oct. 14, 1992 [JP] Japan .................................. 4-300562

[51] Int. Cl.$^6$ .......................... G11B 13/04; G11B 11/14
[52] U.S. Cl. .......................... 369/13; 360/59; 360/114
[58] Field of Search ................. 369/13–14; 360/59, 360/114, 110, 119, 120, 121, 122, 125, 126, 127, 103; 365/122; 252/62.61

[56] References Cited

U.S. PATENT DOCUMENTS

| | | | |
|---|---|---|---|
| 3,810,245 | 5/1974 | Ozawa et al. | 360/127 |
| 3,827,083 | 7/1974 | Hosaka et al. | 360/125 |
| 4,246,619 | 1/1981 | Hirai et al. | 360/125 |
| 4,316,228 | 2/1982 | Fujiwara et al. | 360/127 |
| 4,331,548 | 5/1982 | Yorizumi et al. | 252/62.61 |
| 4,439,794 | 3/1984 | Shiroishi et al. | 360/127 |
| 4,450,494 | 5/1984 | Foywara et al. | 360/125 |
| 4,571,652 | 2/1986 | Fujiwara et al. | 360/125 X |
| 5,084,795 | 1/1992 | Sakakima et al. | 360/120 |
| 5,202,806 | 4/1993 | Kawase | 360/120 |
| 5,202,862 | 4/1993 | Ohta et al. | 369/13 |
| 5,202,863 | 4/1993 | Migatake et al. | 369/13 |
| 5,218,500 | 6/1993 | Okuda et al. | 320/127 X |
| 5,233,492 | 8/1993 | Iwata et al. | 360/126 X |

FOREIGN PATENT DOCUMENTS

| | | |
|---|---|---|
| 0439323A1 | 7/1991 | European Pat. Off. . |
| 57-055522 | 4/1982 | Japan . |
| 61-292210 | 12/1986 | Japan . |
| 1-217703 | 8/1989 | Japan . |
| 2-044099 | 2/1990 | Japan . |
| 2-126408 | 5/1990 | Japan . |
| 3-127346 | 5/1991 | Japan . |
| 3-152709 | 6/1991 | Japan . |
| 0494502 | 3/1992 | Japan . |

OTHER PUBLICATIONS

European Search Report.
Ohta, "Magnetocrystalline Anisotropy and Magnetic Permeability of Mn–Zn–Fe Ferrites," Journal of the Physical Society of Japan, vol. 18, No. 5, May 1963, pp. 685 through 690.

*Primary Examiner*—Ali Neyzari
*Attorney, Agent, or Firm*—Fitzpatrick, Cella, Harper & Scinto

[57] ABSTRACT

A magneto-optical recording apparatus comprises an optical head for irradiating a magneto-optical recording medium with an optical beam, and a magnetic head for applying a magnetic field to the recording medium, a core of which is made of a single crystal ferrite material. In the magneto-optical recording apparatus, an easy magnetization direction based on a magnetic anisotropy of the single crystal ferrite material constituting a main pole portion of the core of the magnetic head may be arranged so as to be substantially coincident with a direction of the magnetic field applied to the magneto-optical recording medium, or with a direction of magnetization caused by a coil in a coil winding portion of the core of the magnetic head.

36 Claims, 5 Drawing Sheets

K₁ AND μ OF Mn-Zn-Fe FERRITES 5,627,804

MAGNETO-OPTICAL RECORDING APPARARTUS INCLUDING A MAGNETIC HEAD HAVING A CORE COMPOSED OF A SINGLE CRYSTAL FERRITE MATERIAL

This application is a continuation of application Ser. No. 08/304,432, filed Sep. 12, 1994, which is a continuation of prior application Ser. No. 07/964,846, filed Oct. 22, 1992, both now abandoned.

BACKGROUND OF THE INVENTION

1. Field of the Invention

The present invention relates to a magneto-optical recording apparatus which irradiates a magneto-optical recording medium with a laser beam and applies a modulation magnetic field to the side of the medium opposite to the irradiation side thereof to conduct magneto-optical information recording.

2. Related Background Art

In the magneto-optical recording apparatus of this type, information recording is performed as follows. A laser beam emitted from a semiconductor laser is converged by an optical head into a beam spot of a diameter of about 1 μm to irradiate, for example, a magneto-optical recording medium in the form of a disk, and an external modulation magnetic field is applied at a position corresponding to the irradiation position through a magnetic head in a direction normal to the magneto-optical recording medium.

A main part of such a magneto-optical recording apparatus is structured, for example, as shown in FIG. 1. There is a recording layer 2 of a vertical magnetization film in the upper portion of the disk magneto-optical recording medium 1. A magnetic head 3 is disposed to face the recording layer 2 above the magneto-optical recording medium 1 and is movable in a tracking direction. Further, an optical head 4 is disposed to face the magnetic head 3 below the magneto-optical recording medium 1 and is movable in the tracking direction and in a focusing direction.

The magnetic head 3 is constituted by a U-shaped core 5, which is made of a magnetic material with a high permeability, for example, a sintered ferrite material, a coil 6 wound around a main pole portion of the core 5, and a slider 7 for floating to hold the magnetic head 3 with a slight gap between it and a surface of the magneto-optical recording medium. The slider 7 is made, for example, of a non-magnetic material such as a ceramic.

In an information recording operation, while the recording medium 1 is rotated at a high speed, a laser beam from the optical head 4 is converged into a beam spot b of a diameter of about 1 μm to irradiate the recording layer 2 so as to heat a portion thus irradiated. An electric current modulated by an information signal is supplied to the coil 6 on the magnetic head 3 to excite the core 5. Then, a vertical magnetic field c along a direction of magnetization at that moment is applied to the vicinity of the beam spot b on the recording layer from the main pole portion 5p of the core 5.

However, when the information recording operation is carried out by using the above magnetic head, the magnetic head has a high heating characteristic due to the material of the core generating a bias magnetic field, that is, due to a high-frequency loss peculiar to the magnetic material. The heating itself may possibly deteriorate the magnetic properties and other properties, and will negatively affect the facing recording layer of the magneto-optical recording medium. In detail, in the case where the core of the magnetic head is made of a polycrystal Mn-Zn ferrite material, a peculiar loss is seen if the core is excited at a high frequency. As a result, the core heats up and causes a change in magnetic properties, for example, a decrease in permeability, and a decrease in saturation magnetic flux density, so that a magnetic field of sufficient strength may not be applied, which results in a failure to provide good signal recording. Also, a thermal, negative effect is a deformation of the magneto-optical recording medium. On the other hand, if the frequency of the information signal is decreased in order to avoid these problems, then the transfer speed of the information signal cannot be increased, which is contrary to the desired high speed processing.

Further, in order to obtain a magnetic field of sufficient strength applied using the above magnetic head, a relatively large electric current, for example, three to five times the amount of electric current applied to a magnetic head used for a hard disk, must be supplied to the coil 6. Hence, there is a problem in that it requires an increase in dissipation power of a drive circuit supplying the electric current to the coil 6. The supply of such a large electric current restricts the upper limit of the recording frequency in the designing of the drive circuit for the magnetic head, which prevents an increase in the recording speed of an information signal.

SUMMARY OF THE INVENTION

The present invention has been accomplished taking the above circumstances into consideration, and provides a magneto-optical recording apparatus in which a material for a core in a magnetic head is specified and in which a strength of the magnetic field is sufficiently enhanced using a magnetic anisotropy as compared to an amplitude of supply current.

To achieve the above, in a magneto-optical recording medium according to the present invention in which the recording of an information signal is carried out by applying a magnetic field modulated based on an information signal to a magneto-optical recording medium by a magnetic head, a core of the magnetic head is made of a single crystal ferrite material.

In this arrangement, the core is preferably arranged so that an easy magnetization direction based on a magnetic anisotropy of the ferrite single crystal, at least in the main pole portion of the core, is perpendicular to a recording layer of the magneto-optical recording medium (that is, coincident with a direction of the magnetic field applied), or, that an easy magnetization direction based on the magnetic anisotropy of the ferrite single crystal, in an excitation coil winding portion of the core, is substantially coincident with a direction of excitation by an excitation coil.

In this arrangement, in the coil winding portion or in the main pole portion of the core to generate the magnetic field, the crystal orientation (easy magnetization direction)based on the magnetic anisotropy of the single crystal ferrite material allows generation of an effective and sufficient magnetic field in cooperation with the magnetization by the electric current flowing through the coil.

DETAILED DESCRIPTION OF THE PREFERRED EMBODIMENTS

Figure 1:
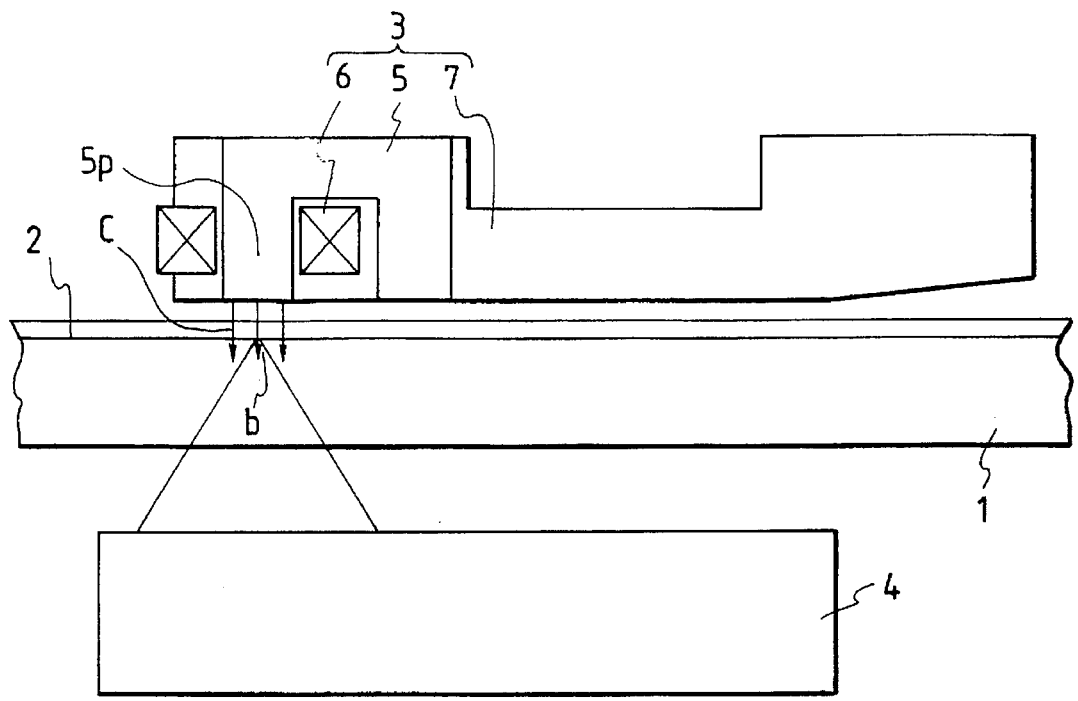
FIG. 1 is a schematic side view of a conventional example.

An embodiment of the present invention is explained below with reference to FIGS. 2, 3A, and 3B. A main part of a magneto-optical recording apparatus as shown has the same structure as the conventional example as shown in FIG. 1 except for certain characteristics of the material of the magnetic core 5. The same elements are given the same numerals as in FIG. 5 and explanations thereof are omitted herein. The magnetic core 5 according to the present invention is made of a single crystal ferrite material such as $MnO \cdot ZnO \cdot Fe_2O_3$. As is well known, the single crystal ferrite material has a peculiar magnetic anisotropy, which is easily magnetized in a specific crystal orientation (easy magnetization direction). For example, if the single crystal ferrite material employed in the present invention is a ferrite material of a cubic crystal system, then the easy magnetization direction may be selectively made by changing its composition, in any one of three orientations of the crystallographic axes <100>, <110>, and <111>. In this regard, the sintered ferrite materials conventionally employed as the magnetic core do not have such a magnetic anisotropy as described above.

The crystallographic axis <100> is a general notation for crystallographic axes [100], [010], [001], [$\bar{1}$00], [0$\bar{1}$0], and [00$\bar{1}$] in a cubic crystal system, but does not represent only one of the axes. Also, the axes <110> and <111> are respective notations similarly defined as the above <100>.

Figure 2:
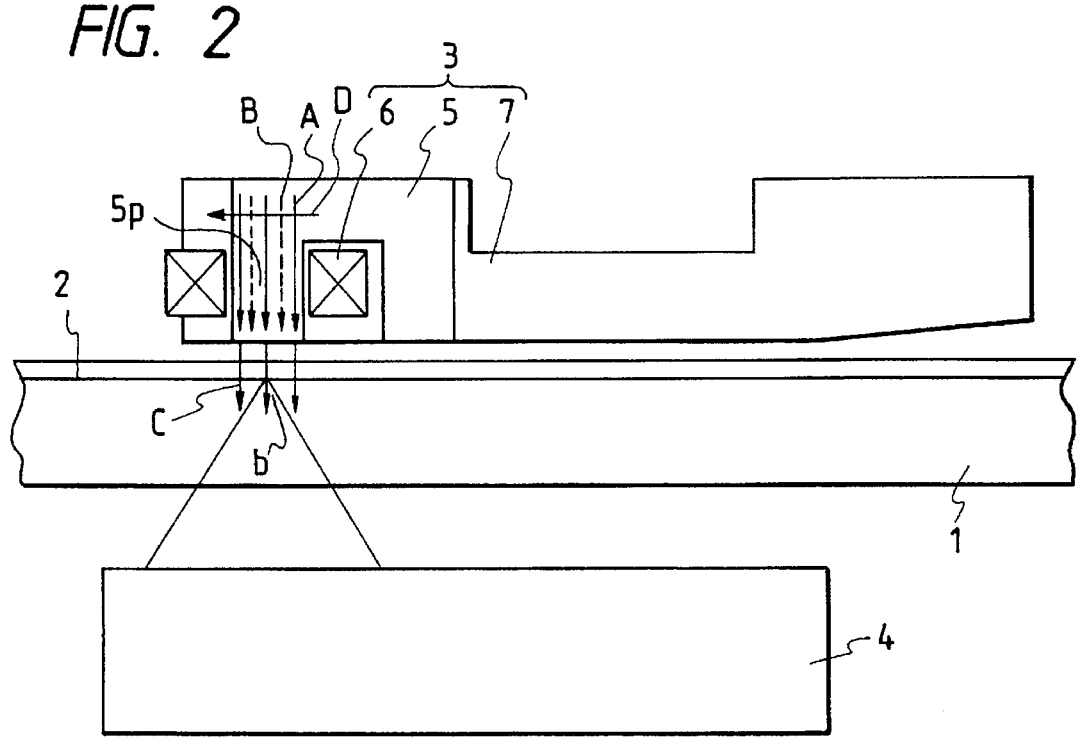
FIG. 2 is a schematic side view of a main part of a magneto-optical recording apparatus to show a first embodiment of the present invention.

A core of a single crystal ferrite having an easy magnetization direction in a direction of <100> was produced in a shape as shown in FIG. 2. Comparing values measured using this core as a magnetic head with values of conventional ones, a magnetic field of desired strength was obtained with an electric current lower by 15% and the high-frequency loss was reduced lower by 20% at a frequency of 10 MHz.

The present invention uses these features. A first requirement of the present invention is that the easy magnetization direction of the single crystal ferrite material employed for the core 5 is arranged in the main pole portion 5p of the core 5 (a portion of the magnetic pole opposing the beam spot b) so as to be substantially coincident with a direction of the magnetic field applied to the recording layer 2 of the magneto-optical recording medium 1 (a direction of magnetic field generated by the main pole portion 5p). Namely, in the embodiment as shown in FIG. 2, the easy magnetization direction of the single crystal ferrite material is shown by an arrow A, which is substantially coincident with the direction of the applied magnetic field as shown by an arrow C. In this case, the strength of the magnetic field generated by the main pole portion 5p is greater than that when the arrangement does not satisfy the above requirement. Thus, even if the current supplied to the excitation coil 6 is reduced, a sufficient magnetic field may be generated, whereby the magnetic field may be efficiently applied to the magneto-optical recording medium 1.

A second requirement of the present invention is that the easy magnetization direction of the single crystal ferrite material employed for the core 5 is arranged in the winding portion of the excitation coil 6 so as to be substantially coincident with a direction of the excitation by the excitation coil 6. Namely, in the embodiment as shown in FIG. 2, the easy magnetization direction of the single crystal ferrite material as shown by the arrow A is substantially coincident with the direction of excitation caused by the excitation coil 6 as shown by the arrow B. In this case, the high-frequency loss of the ferrite single crystal is smaller than that when the arrangement does not satisfy the above second requirement, so that the heating of the core 5 may be restricted.

In this embodiment, since the excitation coil 6 is wound around the main pole portion 5p of the core, the direction (arrow C) of the magnetic field applied to the recording layer 2 of the magneto-optical recording medium 1 is originally the same as the direction (arrow B) of excitation by the excitation coil 6. Therefore, both the first and the second enforceability requirements are simultaneously satisfied in this embodiment.

Figure 3A:
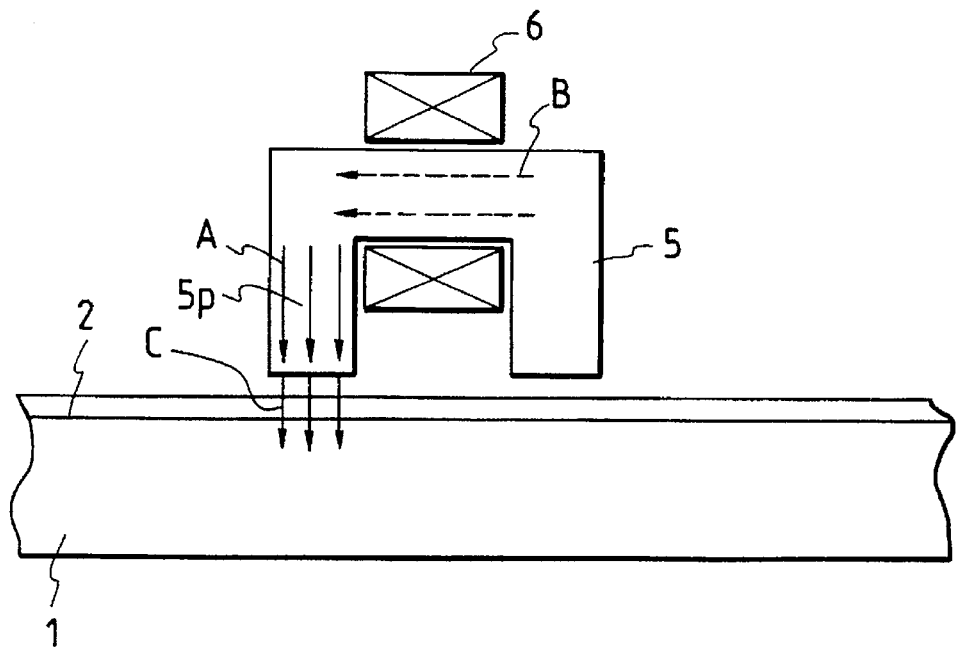
FIGS. 3A and 3B are schematic side views of the main part to show another embodiment of the present invention.
Figure 3B:
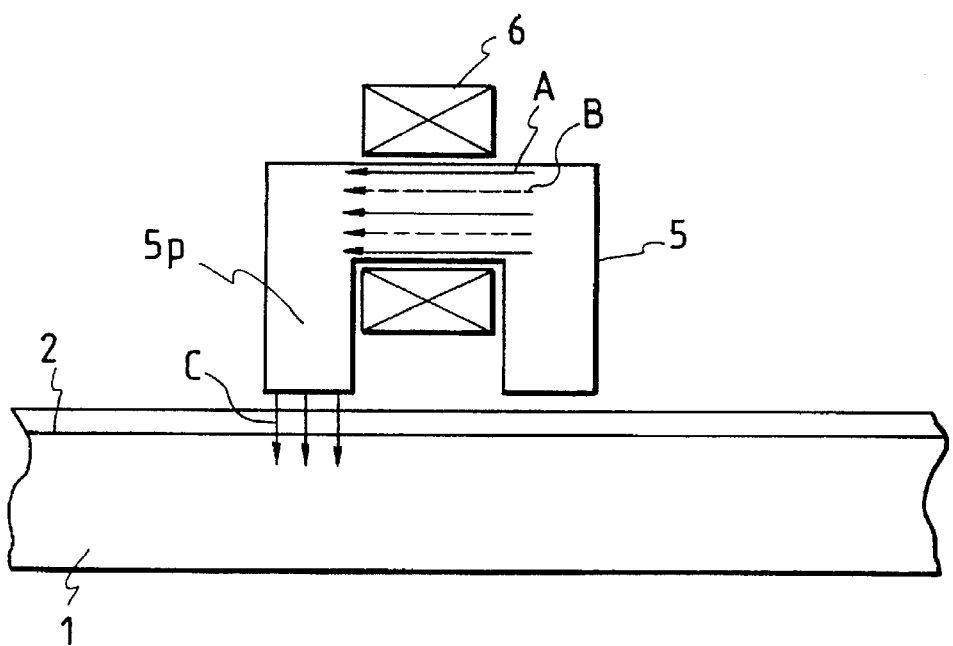

FIGS. 3A and 3B show another embodiment, in which the coil 6 is wound around a portion of the core 5 perpendicular to the main pole portion 5p. There may be two crystal orientations selected in this embodiment. In detail, in the case of FIG. 3A, the easy magnetization direction, as shown by a solid line of arrow A, is the same as the direction (arrow C) of the magnetic field applied to the recording layer 2, while the direction of excitation is directed in the horizontal direction (broken line arrow B) in the winding portion of the coil 6, which may cause a magnetic effect on the main pole portion 5p. This arrangement satisfies the above first requirement. In contrast, in the case of FIG. 3B, the easy magnetization direction is chosen in the direction of solid line arrow A to be coincident with the excitation direction (arrow B) by the coil 6. This arrangement satisfies the above second requirement. It is needless to mention that either of the above cases may enjoy the same merits and advantages as the first embodiment with respect to overall function.

Figure 6:
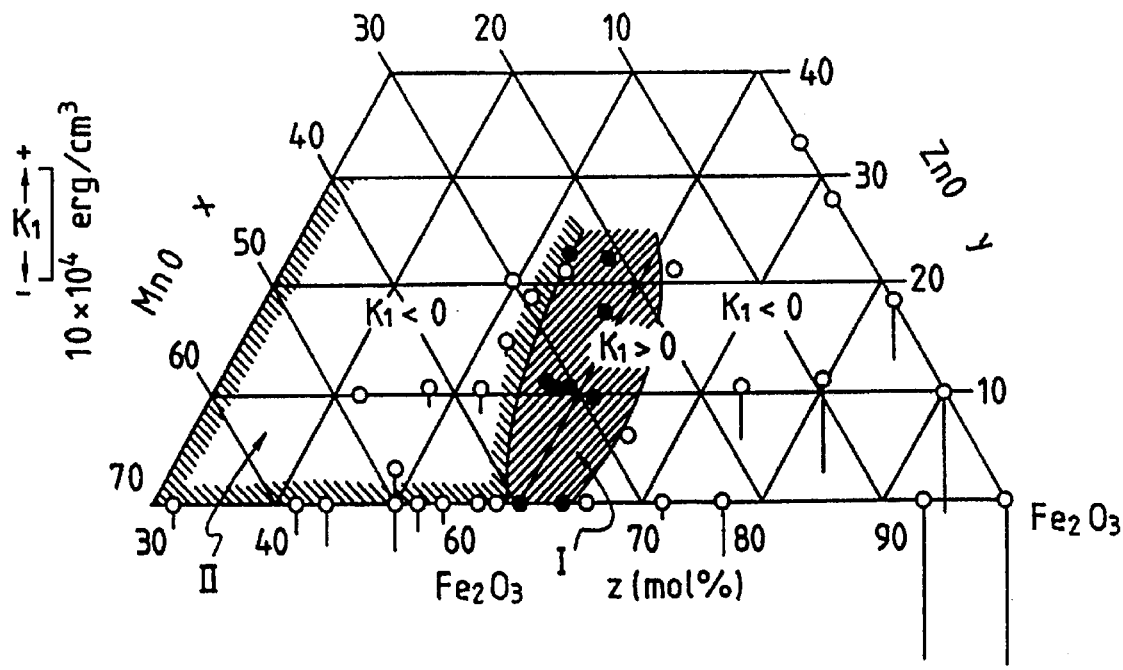
FIG. 6 is a diagram to show a relation between a composition of a ferrite single crystal according to the present invention and a magnetic anisotropy constant.

The following explanation, in connection with a composition percentage, are examples in which at least the main pole portion or the excitation coil winding portion of the core of the magnetic head is made of a single crystal of cubic crystal ferrite containing $MnO \cdot ZnO \cdot Fe_2O_3$ as a main component. FIG. 6 shows a relation between respective composition percentages of MnO, ZnO, and $Fe_2O_3$ and a first magnetic anisotropy constant $K_1$ (Keizo Ohta, "Magnetocrystalline Anisotropy and Magnetic Permeability of Mn-Zn-Fe Ferrites", J. Phys. Soc. Japan Vol. 18 No, 5 P 685. May 1963). In FIG. 6, a region I represents compositions in which the first magnetic anisotropy constant $K_1$ is not less than zero. In this region, the easy magnetization direction is the direction of the crystallographic axis <100>. A region II represents compositions in which a composition percentage of $Fe_2O_3$ is not more than 60 mol % and the first magnetic anisotropy constant $K_1$ is not more than zero. In the region II, the easy magnetization direction is the direction of the crystallographic axis <111>.

In the present invention, an example of which satisfies the first requirement is featured as follows. At least the main pole portion 5p of the core of the magnetic head is comprised of a single crystal of cubic crystal ferrite containing MnO.ZnO.Fe$_2$O$_3$ as a main component. The single crystal has a first magnetic anisotropy constant K$_1$ not less than zero at room temperature. The crystallographic axis <100> of the single crystal is arranged so as to be substantially coincident with the direction of the above magnetic field (in the embodiment as shown in FIG. 3A, the main pole portion 5p facing the recording medium 1 has the easy magnetization direction aligned in the direction of arrow A while being substantially coincident with the direction of the magnetic field C applied).

Also in the present invention, another example of which satisfies the first requirement is featured as follows. At least the main pole portion of the core of the magnetic head is comprised of a single crystal of cubic crystal ferrite containing MnO.ZnO.Fe$_2$O$_3$ as a main component in which a composition percentage of Fe$_2$O$_3$ is not more than 60 mol %. The single crystal has a first magnetic anisotropy constant K$_1$ not more than zero at room temperature; the crystallographic axis <111> of the single crystal is arranged so as to be substantially coincident with the direction of the above magnetic field.

Also in the present invention, an example of which satisfies the second requirement is featured as follows. At least the excitation coil winding portion of the core of the magnetic head is comprised of a single crystal of cubic crystal ferrite containing MnO.ZnO.Fe$_2$O$_3$ as a main component. The single crystal has a first magnetic anisotropy constant K$_1$ not less than zero at the ordinary temperature. The crystallographic axis <100> of the single crystal is arranged so as to be substantially coincident with the direction of excitation caused by the excitation coil. (In the embodiment as shown in FIG. 3B, the core 5 has the crystallographic axis <100>, which is the easy magnetization direction, aligned in the direction of arrow A in the winding portion of the excitation coil 6 while being substantially coincident with the excitation direction B of the excitation coil 6).

Further, in the present invention, another example of which satisfies the second requirement is featured as follows: At least the excitation coil winding portion of the core of the magnetic head is comprised of a single crystal of cubic crystal ferrite containing MnO.ZnO.Fe$_2$O$_3$ as a main component in which a composition percentage of Fe$_2$O$_3$ is not more than 60 mol %. The single crystal has a first magnetic anisotropy constant K$_1$ not more than zero at room temperature. The crystallographic axis <111> of the single crystal is arranged so as to be substantially coincident with the excitation direction by the excitation coil.

Figure 4:
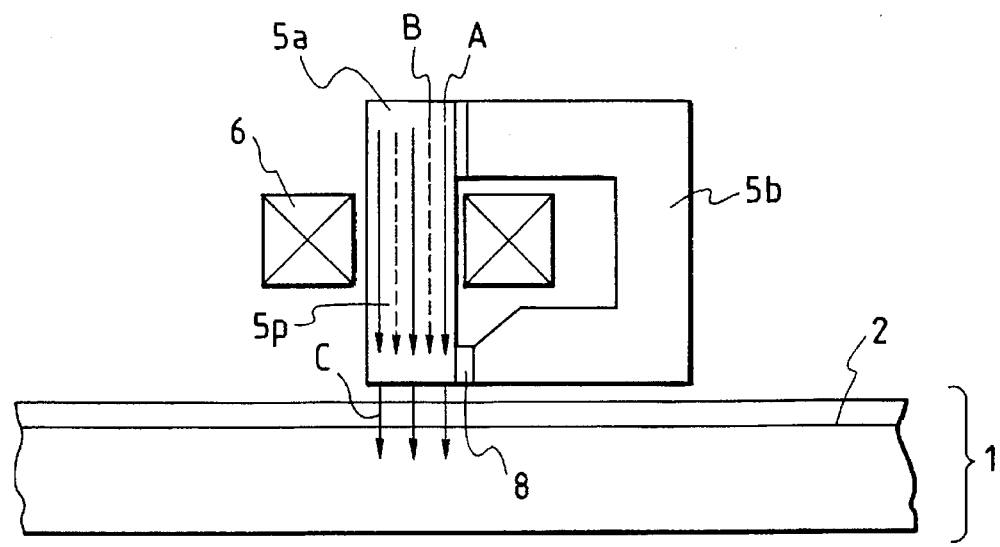
FIG. 4 is a schematic side view to show a main part of still another embodiment of the present invention.
Figure 5:
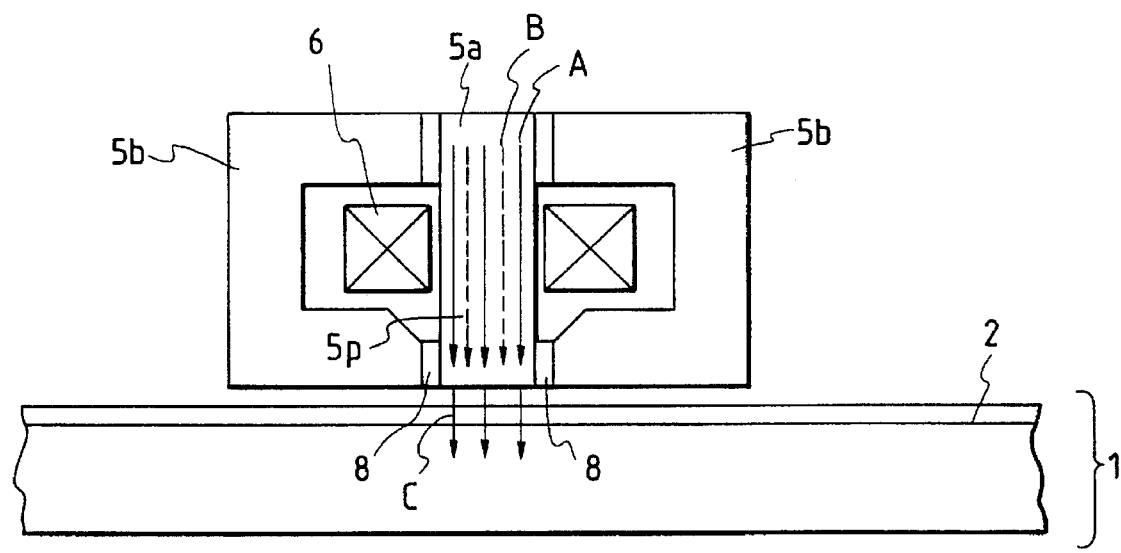
FIG. 5 is a schematic side view to show a main part of still another embodiment of the present invention.

As explained above, if the present invention is applied to the structure of the first embodiment as shown in FIG. 2, both the first and second requirements are simultaneously satisfied. That is the case also in the embodiments as shown in FIGS. 4 and 5. In the embodiment as shown in FIG. 4, the core of the magnetic head is constituted by a combination of core members shown by numerals 5a and 5b, and also has a gap portion 8 made of a non-magnetic material, forming a so-called "ring head". In the embodiment as shown in FIG. 5, the core of the magnetic head is constituted by a combination of a rod core member 5a and two U-shaped core members 5b and 5c, and also has two gap portions 8 made of a non-magnetic material. In these embodiments, a ferrite single crystal with a composition in either of the regions I and II is used for the main pole portion 5p of the core, and the easy magnetization direction A is coincident with the direction C of the magnetic field applied to the recording medium 1, similarly as in the above-described embodiments.

The core members 5b, 5c may be made of the same ferrite single crystal, but may also be made of a polycrystal ferrite as used in the conventional examples.

The present Applicant conducted an experiment using a core with a composition in the region I, for example of MnO:27 mol %, ZnO:18 mol %, and Fe$_2$O$_3$:55 mol %, in the structure as shown in FIG. 2. According to the experiment, the core thus made showed a decrease of 20 to 30% in heating amount at a drive frequency of 5 to 10 MHz, as compared to cases using the conventional core of polycrystal ferrite. When the inductance was identical, it was confirmed that the core of the present invention assured the application magnetic field of sufficient strength with a drive current lower by about 10%.

The relation diagram (FIG. 6) presented to explain the above embodiments is an example of a ferrite single crystal. It should be noted that the ranges occupied by the regions I and II change depending upon the production conditions. Therefore, the regions I and II as shown in FIG. 6 do not limit the compositions of the present invention in a strict sense.

Figure 7:
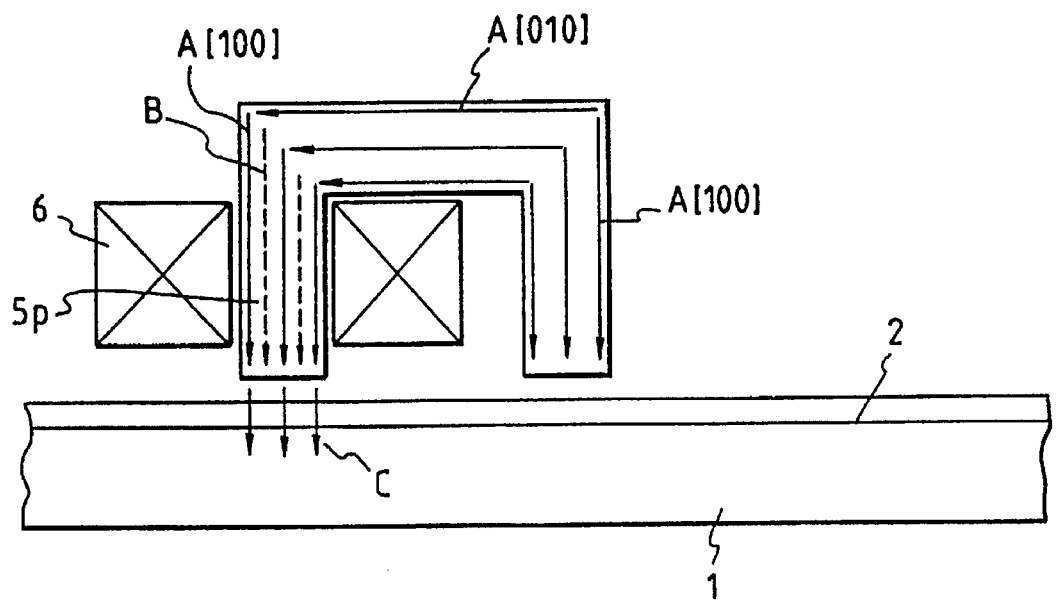
FIG. 7 is a drawing to illustrate a most ideal embodiment of the present invention.

FIG. 7 shows a most preferred embodiment of the present invention. In the most preferred embodiment, as described above, the easy magnetization direction (arrow A) is coincident with the magnetic field application direction (arrow C) in the main pole portion 5p, the easy magnetization direction (arrow A) is coincident with the excitation direction (arrow B) by the excitation coil 6, and the easy magnetization direction (arrow A) is provided along the magnetic path in the other portions of the core 5. Specifically, in the cubic crystal system, there always exist a crystallographic axis <100> and a counter crystallographic axis <100> normal thereto. Thus, such an ideal mode may be attained by integral formation of a U-shaped core using a single crystal ferrite having an easy magnetization direction of crystallographic axis <100>. Here, the crystallographic axis <100> is a general notation for the crystallographic axes [100], [010], [001], [$\bar{1}$00], [0$\bar{1}$0], and [00$\bar{1}$] in the cubic crystal system, but does not represent only one of the directions. The direction as shown in FIG. 7 is an example thereof.

The above embodiment is an example of the selection of a crystal orientation most preferable to achieve the object of using the magnetic anisotropy of a single crystal ferrite material, to enable generation of an efficient magnetic field, and to reduce the high-frequency loss. The method of selection is not necessarily limited to this example, but the crystal orientation may be selected taking into consideration a cutting machinability of the core and/or properties relating to the crystal orientation, for example, wear properties of the magnetic pole upon sliding on the magneto-optical recording medium.

There are examples below explained in connection with a temperature dependency of permeability, in which at least the main pole portion or the excitation coil winding portion of the core of the magnetic head is made of a cubic crystal ferrite mainly containing MnO.ZnO.Fe$_2$O$_3$.

There are two ways of selection possible as to the aforementioned single crystal ferrite and the easy magnetization direction thereof.

Figure 8:
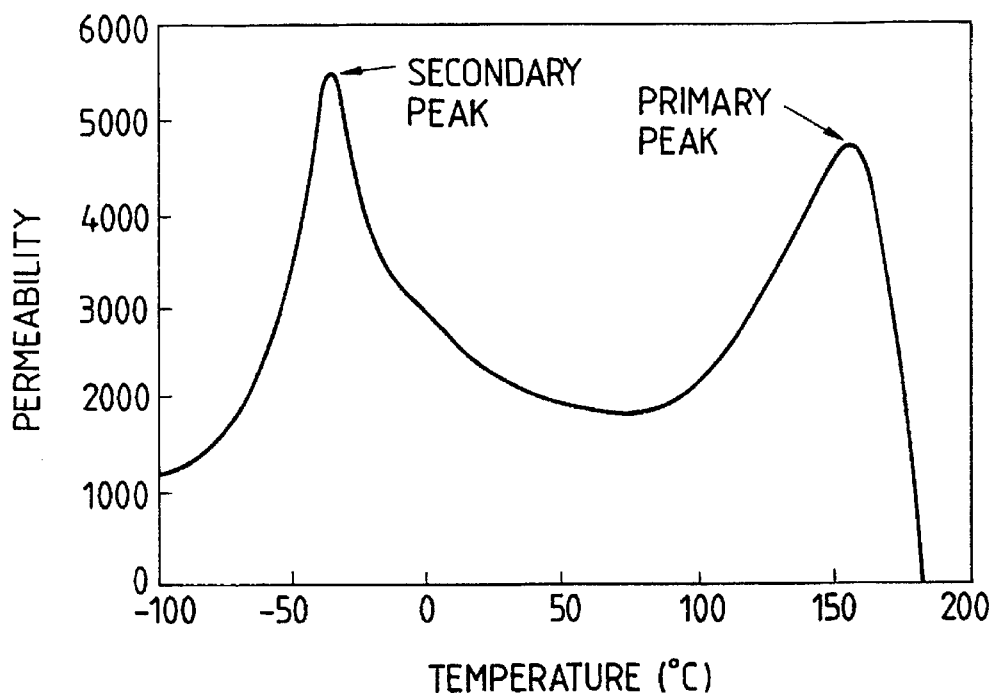
FIG. 8 is a diagram to show a temperature dependency of permeability of a ferrite single crystal comprising $MnO \cdot ZnO \cdot Fe_2O_3$.

The first case is that the ferrite single crystal has a temperature dependency of permeability in which a primary peak of permeability appears at a temperature above the ordinary temperature and a second peak of permeability appears at a temperature below the ordinary temperature and further that the crystallographic axis <100> is the easy magnetization direction. This is explained with reference to FIG. 8. FIG. 8 shows an example of a temperature dependency of permeability of a single crystal ferrite. A permeability curve usually has two local maxima, one on the high temperature side and the other on the low temperature side. The former is called a primary peak and the latter is a secondary peak. The example as shown in FIG. 8 has a primary peak at a temperature higher than room temperature and a secondary peak at a temperature lower than room temperature. Such a single crystal ferrite may be produced by properly choosing a composition percentage of $MnO.ZnO.Fe_2O_3$ within a range where the composition percentage of the main component $Fe_2O_3$ is not less than 50 mol %.

In such a single crystal ferrite, the crystallographic axis <100> is the easy magnetization direction at room temperature. To satisfy at least one of the aforementioned two requirements as explained with FIG. 2 is sufficient to enjoy the merits and advantages of the present invention, which were confirmed by experiment.

Incidentally, room temperature is generally 20° C. Considering a change in temperature environment in the magneto-optical recording apparatus, it is preferable to use a single crystal ferrite which has a primary peak at a temperature above 60° C. and a secondary peak at a temperature below 0° C.

The second selection of the single crystal ferrite and the easy magnetization direction thereof is that the single crystal has a temperature dependency of permeability in which both a primary peak and a secondary peak of permeability appear at a temperature above room temperature and that the crystallographic axis <111> is the easy magnetization direction. This is explained with reference to FIG. 9.

Figure 9:
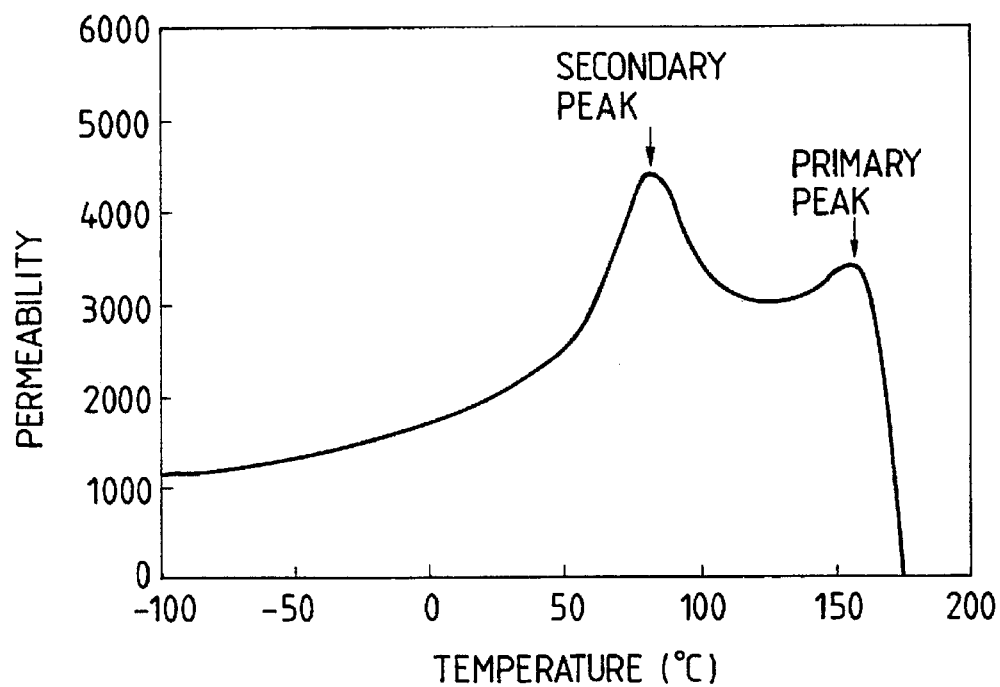
FIG. 9 is a diagram to show another temperature dependency of permeability of a ferrite single crystal comprising $MnO \cdot ZnO \cdot Fe_2O_3$.

FIG. 9 shows another example with a temperature dependency of permeability of a single crystal ferrite. In the example shown in FIG. 9, a permeability curve has two local maxima, which are a primary peak and a secondary peak, as in the aforementioned example. The two peaks are located above room temperature. Such a single crystal ferrite may be produced by properly choosing a composition percentage of $MnO.ZnO.Fe_2O_3$ within a range where a composition percentage of main component $Fe_2O_3$ is not more than 60 mol %. In such a single crystal ferrite, the crystallographic axis <111> is the easy magnetization direction at room temperature. To satisfy at least one of the aforementioned two requirements as explained with FIG. 2 is effective to enjoy the merits and advantages of the present invention, which was confirmed by experiment. Provided that room temperature is generally 20° C. as explained above, considering a change in temperature environment in the magneto-optical recording apparatus, it is preferable to use a single crystal ferrite having a primary peak and a secondary peak both above 60° C.

Explained below using FIG. 2 is a first structure of an example which satisfies the first requirement as explained with FIG. 2. The single crystal ferrite making the core 5 as shown in FIG. 2 has a temperature dependency of permeability as shown in FIG. 8. In detail, the single crystal ferrite is chosen to have a primary peak of permeability at a temperature above room temperature and a secondary peak of permeability at a temperature below room temperature. Further, at least in the main pole portion 5p facing the recording layer 2 to apply a magnetic field, the crystallographic axis <100> is arranged so as to be aligned in the direction as shown by the arrow A in FIG. 2, and therefore as to be substantially coincident with the direction of the magnetic field as shown by the arrow C, which is generated by the main pole portion 5p and applied to the recording layer 2.

Next explained is a second structure of another example which satisfies the first requirement as explained with FIG. 2. In the second structure, the single crystal ferrite making the core 5 has a temperature dependency of permeability as shown in FIG. 9. In detail, the single crystal ferrite is chosen to have a primary peak and a secondary peak of permeability both above room temperature. Further, at least in the main pole portion 5p facing the recording layer 2 to apply a magnetic field, the crystallographic axis <111> is arranged so as to be aligned in the direction as shown by the arrow A in FIG. 2, and therefore to be substantially coincident with the direction of the magnetic field as shown by the arrow C, which is generated by the main pole portion 5p and applied to the recording layer 2.

Next explained with reference to FIG. 2 is a first structure which satisfies the aforementioned second requirement as explained with FIG. 2. The single crystal ferrite making the core 5 as shown in FIG. 2 has a temperature dependency of permeability as shown in FIG. 8. In detail, the single crystal ferrite is chosen to have a primary peak of permeability above room temperature and a secondary peak below room temperature. Further, at least in the winding portion of the excitation coil 6, the crystallographic axis <100> is arranged so as to be aligned with the direction as shown by the arrow A in FIG. 2, and therefore as to be substantially coincident with the direction of the excitation as shown by the arrow B, which is caused by the excitation coil 6 in the core 5.

Next explained is a second structure which satisfies the second requirement as explained with FIG. 2. In this case, the single crystal ferrite making the core 5 has a temperature dependency of permeability as shown in FIG. 9. In detail, the single crystal ferrite is chosen to have a primary peak and a secondary peak of permeability both above room temperature. Further, at least in the winding portion of the excitation coil 6, the crystallographic axis <111> is arranged so as to be aligned with the direction as shown by the arrow A in FIG. 2, and therefore as to be substantially coincident with the direction of the excitation as shown by the arrow B, which is caused by the excitation coil 6 in the core 5.

In the present embodiment, since the excitation coil 6 is arranged to be directly wound around the main pole portion 5p of the core 5 and to be excited, both the first and the second requirements are simultaneously satisfied.

In such a ferrite single crystal, there always exists one crystallographic axis <100> and a counter crystallographic axis <100> normal thereto. Thus, if the core is shaped as in the present embodiment, it is possible that the crystallographic axis <100> is aligned in the direction as shown by an arrow D normal to the arrow A, as well as in the direction of the arrow A as shown in the drawing. As such, most of the magnetic paths may be aligned along the direction of crystallographic axis <100>, which assures the greatest effect.

Next explained with reference to FIGS. 3A and 3B are examples in which the winding portion of the excitation coil 6 is not coincident with the main pole portion 5p of the core 5. FIG. 3A shows a first structure which satisfies the aforementioned first requirement. In the first structure, the single crystal ferrite making the core 5 has a temperature dependency of permeability as shown in FIG. 8. In detail, the single crystal ferrite has a primary peak of permeability above room temperature and a second peak of permeability below room temperature. Further, at least in the main pole portion 5p facing the recording layer 2 to apply a magnetic field, the crystallographic axis <100> is arranged so as to be aligned with the direction as shown by the arrow A in the drawing, and therefore to be substantially coincident with the direction of the application magnetic field as shown by the arrow C, which is generated by the main pole portion 5p and applied to the recording layer 2.

Next explained is a second structure which satisfies the first requirement. In this case, the single crystal ferrite making the core 5 has a temperature dependency of permeability as shown in FIG. 9. In detail, the single crystal ferrite is chosen to have a primary peak and a secondary peak of permeability both above room temperature. Further, at least in the main pole portion 5p facing the recording layer 2 to apply a magnetic field, the crystallographic axis <111> is arranged so as to be aligned with the direction as shown by the arrow A in the drawing, and therefore to be substantially coincident with the direction of the application magnetic field as shown by the arrow C, which is generated by the main pole portion 5p and applied to the recording layer 2.

FIG. 3B shows a first structure which satisfies the aforementioned second requirement. In the first structure, the single crystal ferrite making the core 5 has a temperature dependency of permeability as shown in FIG. 8. In detail, the single crystal ferrite is chosen to have a primary peak of permeability above room temperature and a secondary peak of permeability below room temperature. Further, at least in the winding portion of the excitation coil 6, the crystallographic axis <100> is arranged so as to be aligned with the direction as shown by the arrow A in the drawing, and therefore to be substantially coincident with the direction of the excitation as shown by the arrow B, which is caused by the excitation coil 6 in the core 5.

Next explained is a second structure which satisfies the second requirement. In this case, the single crystal ferrite making the core 5 has a temperature dependency of permeability as shown in FIG. 9. In detail, the single crystal ferrite is chosen to have a primary peak and a secondary peak of permeability both above room temperature. Further, at least in the winding portion of the excitation coil 6, the crystallographic axis <111> is arranged so as to be aligned with the direction as shown by the arrow A in the drawing, and therefore to be substantially coincident with the direction of the excitation as shown by the arrow B, which is caused by the excitation coil 6 in the core 5.

In these examples, since the main pole portion 5p of the core 5 is not coincident with the winding portion of the exciting coil 6, the aforementioned first and second requirements are not simultaneously satisfied, but a sufficient effect may be obtained with satisfaction of at least one of the requirements.

Also, the entire core 5 does not necessarily have to be integrally made of a single crystal ferrite. The core 5 may be constituted by two or more members, and only a necessary member or necessary members may be made of the single crystal ferrite.

Further, the shape of the core is not restricted to a U-shape. For example, as shown in FIG. 4, the core may be formed by a combination of two core members 5a, 5b with a gap 8 made of a non-magnetic material, which is a so-called ring head. Also, as shown in FIG. 5, the magnetic head may be formed by a core member 5a having two core members 5b on respective sides thereof with two gaps 8. In these examples, in order to satisfy the aforementioned first requirement, the core member 5a including the main pole portion 5p is made of a ferrite single crystal having a temperature dependency of permeability as shown in FIG. 8; and the crystallographic axis <100> is arranged so as to be aligned with the direction of the arrow A in the drawing, and therefore to be substantially coincident with the direction of the application magnetic field as shown by the arrow C, which is generated by the main pole portion 5p and applied to the recording layer 2. Alternatively, the core member 5a may be made of a ferrite single crystal having a temperature dependency of permeability as shown in FIG. 9; and the crystallographic axis <111> may be arranged so as to be aligned with the direction of the arrow A in the drawing, and therefore to be substantially coincident with the direction of the application magnetic field as shown by the arrow C, which is generated by the magnetic pole portion 5p and applied to the recording layer 2.

In this embodiment, since the excitation coil 6 is directly wound around the main pole portion 5p, the direction of the arrow A is coincident with the excitation direction as shown by the arrow B, whereby the aforementioned second requirement is also satisfied.

In the structure of the above-described embodiments, the magnetic head of the present invention can generate a magnetic field with a higher strength than those in the conventional apparatuses, and can apply a sufficient magnetic field to the magneto-optical recording medium even with a reduction in supply current to the excitation coil, whereby a dissipation power of the drive circuit of the magnetic head may be decreased. In addition, the upper limit of recording frequency may be set higher than in the conventional apparatuses, so that the recording speed of an information signal by the magnetic head may be increased.

Also, the high-frequency loss of the core may be restrained, whereby a change in magnetic properties, such as a decrease in permeability and a decrease in saturation magnetic flux density due to heating, can be prevented. Further, the thermal, negative effect, for example, a deformation of the magneto-optical recording medium, may be prevented.

It was experimentally confirmed, using a ferrite single crystal having a temperature dependency of permeability as shown in FIG. 8 for the magnetic head shaped as shown in FIG. 2 with the crystallographic axis <100> being aligned with the direction as shown by the arrow A, that the heating amount was reduced by 20 to 30% at a drive frequency of 5 to 10 MHz as compared to that in a conventional one using a polycrystal ferrite, and that when the inductance was kept equal a sufficient magnetic field could be generated with a drive current reduced by about 10%.

The present invention was detailed above. In a magneto-optical recording apparatus according to the present invention in which a magnetic field is applied by a magnetic head to the magneto-optical recording medium to conduct information recording, the magnetic head is provided with the core made of a single crystal ferrite material, and the core is arranged so that the crystal orientation of the single crystal ferrite material has a directional property easy in magnetization in the same direction as the excitation direction of the coil in the coil winding portion of the core in recording, or, that the crystal orientation has a directional property in the same direction as the application magnetic field in the main pole portion. In this manner, a sufficient vertical magnetic field may be applied to the recording layer of the magneto-optical recording medium with a low electric current, thereby reducing the dissipation power in the electric circuit supplying the current to the coil. Also, the high-frequency loss in the magnetic head is reduced, so that, with less heating, negative effects such as deterioration in magnetic or other properties may be avoided on the magnetic head itself, and also that negative influences on the recording medium may be avoided. Accordingly, a power supply may be performed at a higher frequency, so that excellent effects may be attained, for example, an increase in the transfer speed of information.

What is claimed is:

1. A magneto-optical recording apparatus comprising:
   an optical head for irradiating a magneto-optical recording medium with an optical beam; and
   a magnetic head for applying a magnetic field to said recording medium, said magnetic head comprising a core and a coil wound around said core, said core including a main pole portion substantially perpendicular to said recording medium, said main pole portion having an end surface parallel to and facing said recording medium, and a magnetic field being applied perpendicularly to said recording medium from said end surface,
   wherein said main pole portion is made of a single crystal ferrite material, and an easy magnetization direction based on a magnetic anisotropy of said single crystal ferrite material constituting said main pole portion is arranged so as to be substantially coincident with a direction of the magnetic field applied to said magneto-optical recording medium.

2. A magneto-optical recording apparatus according to claim 1, wherein at least said main pole portion of said core of said magnetic head is comprised of a single crystal of cubic crystal ferrite containing $MnO.ZnO.Fe_2O_3$ as a main component, said single crystal having a first magnetic anisotropy constant $K_1$ not less than zero at room temperature and a crystallographic axis <100> substantially coincident with a direction of said magnetic field.

3. A magneto-optical recording apparatus according to claim 1, wherein at least said main pole portion of said core of said magnetic head is comprised of a single crystal of cubic crystal ferrite containing $MnO.ZnO.Fe_2O_3$ as a main component in which a composition percentage of $Fe_2O_3$ is not more than 60 mol %, said single crystal having a first magnetic anisotropy constant $K_1$ not more than zero at room temperature and a crystallographic axis <111> substantially coincident with a direction of said magnetic field.

4. A magneto-optical recording apparatus according to claim 1, wherein at least said main pole portion of said core of said magnetic head is made of a single crystal of cubic crystal ferrite containing $MnO.ZnO.Fe_2O_3$ as a main component and having a temperature dependency of permeability in which a primary peak of permeability appears at a temperature above room temperature and a secondary peak of permeability appears at a temperature below room temperature, said single crystal having a crystallographic axis <100> substantially coincident with a direction of said magnetic field.

5. A magneto-optical recording apparatus according to claim 1, wherein at least said main pole portion of said core or said magnetic head is made of a single crystal of cubic crystal ferrite containing $MnO.ZnO.Fe_2O_3$ as a main component and having a temperature dependency of permeability in which both a primary peak and a secondary peak of permeability appear at a temperature above room temperature, said single crystal having a crystallographic axis <111> substantially coincident with a direction of said magnetic field.

6. An apparatus which applies a magnetic field to a magneto-optical recording medium, comprising a magnetic head for applying a magnetic field to the magneto-optical recording medium, said magnetic head comprising a core and a coil wound around said core, said core including a main pole portion substantially perpendicular to said recording medium, said main pole portion having an end surface parallel to and facing said recording medium, and a magnetic field being applied perpendicularly to said recording medium from said end surface,
   wherein said main pole portion is made of a single crystal ferrite material, and an easy magnetization direction based on a magnetic anisotropy of said single crystal ferrite material constituting said main pole portion is arranged so as to be substantially coincident with a direction of the magnetic field applied to the magneto-optical recording medium.

7. An apparatus according to claim 6, wherein at least said main pole portion of said core of said magnetic head is comprised of a single crystal of cubic crystal ferrite containing $MnO.ZnO.Fe_2O_3$ as a main component, said single crystal having a first magnetic anisotropy constant $K_1$ not less than zero at room temperature and a crystallographic axis <100> substantially coincident with a direction of said magnetic field.

8. An apparatus according to claim 6, wherein at least said main pole portion of said core of said magnetic head is comprised of a single crystal of cubic crystal ferrite containing $MnO.ZnO.Fe_2O_3$ as a main component in which a composition percentage of $Fe_2O_3$ is not more than 60 mol %, said single crystal having a first magnetic anisotropy constant $K_1$ not more than zero at room temperature and a crystallographic axis <111> substantially coincident with a direction of said magnetic field.

9. An apparatus according to claim 6, wherein at least said main pole portion of said core of said magnetic head is made of a single crystal of cubic crystal ferrite containing $MnO.ZnO.Fe_2O_3$ as a main component and having a temperature dependency of permeability in which a primary peak of permeability appears at a temperature above room temperature and a secondary peak of permeability appears at a temperature below room temperature, said single crystal having a crystallographic axis <100> substantially coincident with a direction of said magnetic field.

10. An apparatus according to claim 6, wherein at least said main pole portion of said core of said magnetic head is made of a single crystal of cubic crystal ferrite containing $MnO.ZnO.Fe_2O_3$ as a main component and having a temperature dependency of permeability in which both a primary peak and a secondary peak of permeability appear at a temperature above room temperature, said single crystal having a crystallographic axis <111> substantially coincident with a direction of said magnetic field.

11. A magneto-optical recording apparatus comprising:
    an optical head for irradiating a magneto-optical recording medium with an optical beam; and
    a magnetic head for applying a magnetic field to said recording medium, said magnetic head comprising a core and a coil wound around said core, said core including a main pole portion substantially perpendicular to said recording medium, said main pole portion having an end surface parallel to and facing said recording medium, and a magnetic field being applied perpendicularly to said recording medium from said end surface,
    wherein a coil winding portion of said core is made of a single crystal ferrite material, and an easy magnetization direction based on a magnetic anisotropy of said single crystal ferrite material constituting said coil winding portion of said core is arranged so as to be substantially coincident with a direction of excitation in said coil winding portion of said core.

12. A magneto-optical recording apparatus according to claim 11, wherein at least said coil winding portion of said core of said magnetic head is comprised of a single crystal of cubic crystal ferrite containing $MnO.ZnO.Fe_2O_3$ as a main component, said single crystal having a first magnetic anisotropy constant $K_1$ not less than zero at room temperature and a crystallographic axis <100> substantially coincident with a direction of excitation in said coil winding portion of said core.

13. A magneto-optical recording apparatus according to claim 11, wherein at least said coil winding portion of said core of said magnetic head is comprised of a single crystal of cubic crystal ferrite containing $MnO.ZnO.Fe_2O_3$ as a main component in which a composition percentage of $Fe_2O_3$ is not more than 60 mol %, said single crystal having a first magnetic anisotropy constant $K_1$ not more than zero at room temperature and a crystallographic axis <111> substantially coincident with a direction of excitation in said coil winding portion of said core.

14. A magneto-optical recording apparatus according to claim 11, wherein at least said coil winding portion of said core of said magnetic head is made of a single crystal of cubic crystal ferrite containing $MnO.ZnO.Fe_2O_3$ as a main component and having a temperature dependency of permeability in which a primary peak of permeability appears at a temperature above room temperature and a secondary peak of permeability appears at a temperature below room temperature, said single crystal having a crystallographic axis <100> substantially coincident with a direction of excitation in said coil winding portion of said core.

15. A magneto-optical recording apparatus according to claim 11, wherein at least said coil winding portion of said core of said magnetic head is made of a single crystal of cubic crystal ferrite containing $MnO.ZnO.Fe_2O_3$ as a main component and having a temperature dependency of permeability in which both a primary peak and a secondary peak of permeability appear at a temperature above room temperature, said single crystal having a crystallographic axis <111> substantially coincident with a direction of excitation in said coil winding portion of said core.

16. An apparatus for applying a magnetic field to a magneto-optical recording medium, comprising a magnetic head for applying a magnetic field to the magneto-optical recording medium, said magnetic head comprising a core and a coil wound around said core, said core including a main pole portion substantially perpendicular to said recording medium, said main pole portion having an end surface parallel to and facing said recording medium, and a magnetic field being applied perpendicularly to said recording medium from said end surface, wherein a coil winding portion of said core is made of a single crystal ferrite material, and an easy magnetization direction based on a magnetic anisotropy of said single crystal ferrite material constituting said coil winding portion of said core is arranged so as to be substantially coincident with a direction of excitation in said coil winding portion of said core.

17. An apparatus according to claim 16, wherein at least said coil winding portion of said core of said magnetic head is comprised of a single crystal of cubic crystal ferrite containing $MnO.ZnO.Fe_2O_3$ as a main component, said single crystal having a first magnetic anisotropy constant $K_1$ not less than zero at room temperature and a crystallographic axis <100> substantially coincident with a direction of excitation in said coil winding portion of said core.

18. An apparatus according to claim 16, wherein at least said coil winding portion of said core of said magnetic head is comprised of a single crystal of cubic crystal ferrite containing $MnO.ZnO.Fe_2O_3$ as a main component in which a composition percentage of $Fe_2O_3$ is not more than 60 mol %, said single crystal having a first magnetic anisotropy constant $K_1$ not more than zero at room temperature and a crystallographic axis <111> substantially coincident with a direction of excitation in said coil winding portion of said core.

19. An apparatus according to claim 16, wherein at least said coil winding portion of said core of said magnetic head is made of a single crystal of cubic crystal ferrite containing $MnO.ZnO.Fe_2O_3$ as a main component and having a temperature dependency of permeability in which a primary peak of permeability appears at a temperature above room temperature and a secondary peak of permeability appears at a temperature below room temperature, said single crystal having a crystallographic axis <100> substantially coincident with a direction of excitation in said coil winding portion of said core.

20. An apparatus according to claim 16, wherein at least said coil winding portion of said core of said magnetic head is made of a single crystal of cubic crystal ferrite containing $MnO.ZnO.Fe_2O_3$ as a main component and having a temperature dependency of permeability in which both a primary peak and a secondary peak of permeability appear at a temperature above room temperature, said single crystal having a crystallographic axis <111> substantially coincident with a direction of excitation in said coil winding portion of said core.

21. A magneto-optical recording apparatus comprising:
an optical head for irradiating a magneto-optical recording medium with an optical beam; and
a magnetic head for applying a magnetic field to said recording medium, said magnetic head comprising a core and a coil wound around said core, said core including a main pole portion substantially perpendicular to said recording medium, said main pole portion having an end surface parallel to and facing said recording medium, and a magnetic field being applied perpendicular to said recording medium from said end surface,
wherein said main pole portion and a coil winding portion of said core are made of a single crystal ferrite material, and an easy magnetization direction based on a magnetic anisotropy of said single crystal ferrite material constituting said main pole portion and said coil winding portion of said core are arranged so as to be substantially coincident with a direction of the magnetic field applied to said magneto-optical recording medium and a direction of excitation in said coil winding portion of said core.

22. A magneto-optical recording apparatus according to claim 21, wherein at least said main pole portion and said coil winding portion of said core of said magnetic head are comprised of a single crystal of cubic crystal ferrite containing $MnO.ZnO.Fe_2O_3$ as a main component, said single crystal having a first magnetic anisotropy constant $K_1$ not less than zero at room temperature and a crystallographic axis <100> substantially coincident with a direction of said magnetic field and a direction of excitation in said coil winding portion of said core.

23. A magneto-optical recording apparatus according to claim 22, wherein at least said main pole portion and said coil winding portion of said core of said magnetic head are comprised of a single crystal of cubic crystal ferrite containing MnO.ZnO.Fe$_2$O$_3$ as a main component in which a composition percentage of Fe$_2$O$_3$ is not more than 60 mol %, said single crystal having a first magnetic anisotropy constant K$_1$ not more than zero at room temperature and a crystallographic axis <111> substantially coincident with a direction of said magnetic field and a direction of excitation in said coil winding portion of said core.

24. A magneto-optical recording apparatus according to claim 21, wherein at least said main pole portion and said coil winding portion of said core of said magnetic head are made of a single crystal of cubic crystal ferrite containing MnO.ZnO.Fe$_2$O$_3$ as a main component and having a temperature dependency of permeability in which a primary peak of permeability appears at a temperature above room temperature and a secondary peak of permeability appears at a temperature below room temperature, said single crystal having a crystallographic axis <100> substantially coincident with a direction of said magnetic field and a direction of excitation in said coil winding portion of said core.

25. A magneto-optical recording apparatus according to claim 21, wherein at least said main pole portion and said coil winding portion of said core of said magnetic head are made of a single crystal of cubic crystal ferrite containing MnO.ZnO.Fe$_2$O$_3$ as a main component and having a temperature dependency of permeability in which both a primary peak and a secondary peak of permeability appear at a temperature above room temperature, said single crystal having a crystallographic axis <111> substantially coincident with a direction of said magnetic field and a direction of excitation in said coil winding portion of said core.

26. An apparatus for applying a magnetic field to a magneto-optical recording medium, said apparatus comprising:
a magnetic head for applying a magnetic field to said magneto-optical recording medium, said magnetic head comprising a core and a coil wound around said core, said core including a main pole portion substantially perpendicular to said recording medium, said main pole portion having an end surface parallel to and facing said recording medium, and a magnetic field being applied perpendicularly to said recording medium from said end surface,
wherein said main pole portion and said coil winding portion of said core of said magnetic head are made of a single crystal ferrite material, and an easy magnetization direction based on a magnetic anisotropy of said single crystal ferrite material constituting said main pole portion and said coil winding portion of said core of said magnetic head are arranged so as to be substantially coincident with a direction of the magnetic field applied to said recording medium and a direction of excitation in said coil winding portion of said core.

27. A magnetic field applying apparatus according to claim 26, wherein at least said main pole portion and said coil winding portion of said core of said magnetic head are comprised of a single crystal of cubic crystal ferrite containing MnO.ZnO.Fe$_2$O$_3$ as a main component, said single crystal having a first magnetic anisotropy constant K$_1$ not less than zero at room temperature and a crystallographic axis <100> substantially coincident with a direction of said magnetic field and a direction of excitation in said coil winding portion of said core.

28. A magnetic field applying apparatus according to claim 26, wherein at least said main pole portion and said coil winding portion of said core of said magnetic head are comprised of a single crystal of cubic crystal ferrite containing MnO.ZnO.Fe$_2$O$_3$ as a main component in which a composition percentage of Fe$_2$O$_3$ is not more than 60 mol %, said single crystal having a first magnetic anisotropy constant K$_1$ not more than zero at room temperature and a crystallographic axis <111> substantially coincident with a direction of said magnetic field and a direction of excitation in said coil winding portion of said core.

29. A magnetic field applying apparatus according to claim 26, wherein at least said main pole portion and said coil winding portion of said core of said magnetic head are made of a single crystal of cubic crystal ferrite containing MnO.ZnO.Fe$_2$O$_3$ as a main component and having a temperature dependency of permeability in which a primary peak of permeability appears at a temperature above room temperature and a secondary peak of permeability appears at a temperature below room temperature, said single crystal having a crystallographic axis <100> substantially coincident with a direction of said magnetic field and a direction of excitation in said coil winding portion of said core.

30. A magnetic field applying apparatus according to claim 26, wherein at least said main pole portion and said coil winding portion of said core of said magnetic head are made of a single crystal of cubic crystal ferrite containing MnO.ZnO.Fe$_2$O$_3$ as a main component and having a temperature dependency of permeability in which both a primary peak and a secondary peak of permeability appear at a temperature above room temperature, said single crystal having a crystallographic axis <111> substantially coincident with a direction of said magnetic field and a direction of excitation in said coil winding portion of said core.

31. A magneto-optical recording apparatus comprising:
an optical head for irradiating a magneto-optical recording medium with an optical beam; and
a magnetic head for applying a magnetic field to said recording medium, said magnetic head comprising a core and a coil wound around said core, said core including a portion substantially perpendicular to said recording medium and a portion substantially parallel to said recording medium, said portion substantially perpendicular to said recording medium including a main pole portion, said main pole portion having an end surface parallel to and facing said recording medium, and a magnetic field being applied perpendicular to said recording medium from said end surface,
wherein said core is made of a single crystal ferrite material, and an easy magnetization direction based on a magnetic anisotropy of said single crystal ferrite material constituting said core is arranged so as to extend along said portion substantially perpendicular to said recording medium and said portion substantially parallel to said recording medium.

32. A magneto-optical recording apparatus according to claim 31, wherein said core of said magnetic head is made of a single crystal cubic crystal ferrite containing MnO.ZnO.Fe$_2$O$_3$ as a main component, said single crystal having a first magnetic anisotropy constant K$_1$ not less than zero at room temperature and a crystallographic axis <100> being arranged so as to extend along said portion substantially perpendicular to said recording medium and said portion substantially parallel to said recording medium.

33. A magneto-optical recording apparatus according to claim 31, wherein said core of said magnetic head is made of a single crystal of cubic crystal ferrite containing MnO.ZnO.Fe$_2$O$_3$ as a main component and having a temperature dependency of permeability in which a primary peak of permeability appears at a temperature above room temperature and a secondary peak of permeability appears at a temperature below room temperature, said single crystal having a crystallographic axis <100> being arranged so as to extend along said portion substantially perpendicular to said recording medium and said portion substantially parallel to said recording medium.

34. An apparatus for applying a magnetic field to a magneto-optical recording medium, said apparatus comprising:
- a magnetic head for applying a magnetic field to the magneto-optical recording medium, said magnetic head comprising a core and a coil wound around said core, said core including a portion substantially perpendicular to said recording medium and a portion substantially parallel to said recording medium, said portion substantially perpendicular to said recording medium including a main pole portion, said main pole portion having an end surface parallel to and facing said recording medium, and a magnetic field being applied perpendicularly to said recording medium from said end surface,
- wherein said core is made of a single crystal ferrite material, and an easy magnetization direction based on a magnetic anisotropy of said single crystal ferrite material constituting said core is arranged so as to extend along said portion substantially perpendicular to said recording medium and said portion substantially parallel to said recording medium.

35. A magnetic field applying apparatus according to claim 34, wherein said core of said magnetic head is comprised of a single crystal of cubic crystal ferrite containing $MnO.ZnO.Fe_2O_3$ as a main component, said single crystal having a first magnetic anisotropy constant $K_1$ not less than zero at room temperature and a crystallographic axis <100> being arranged so as to extend along said portion substantially perpendicular to said recording medium and said portion substantially parallel to said recording medium.

36. A magnetic field applying apparatus according to claim 34, wherein at least said core of said magnetic head is made of a single crystal of cubic crystal ferrite containing $MnO.ZnO.Fe_2O_3$ as a main component and having a temperature dependency of permeability in which a primary peak of permeability appears at a temperature above room temperature and a secondary peak of permeability appears at a temperature below room temperature, said single crystal having a crystallographic axis <100> being arranged so as to extend along said portion substantially perpendicular to said recording medium and said portion substantially parallel to said recording medium.

* * * * *

UNITED STATES PATENT AND TRADEMARK OFFICE
CERTIFICATE OF CORRECTION

PATENT NO. : 5,627,804
DATED : May 6, 1997
INVENTOR(S) : Kazuyoshi Ishii

It is certified that error appears in the above-identified patent and that said Letters Patent is hereby corrected as shown below:

ON THE COVER PAGE:

Under item [56] "U.S. PATENT DOCUMENTS":

Line 7, "Foywara et al." should read --Fujiwara et al.--; and
Line 12, "Migatake et al." should read --Miyatake et al.--.

Under item [56] "FOREIGN PATENT DOCUMENTS":

Line 9, "0494502  3/1992  Japan" should read --4-94502  3/1992  Japan--.

COLUMN 2,

Line 53, "direction)based" should read --direction) based--.

COLUMN 5,

Line 52, "first:" should read --first--.

UNITED STATES PATENT AND TRADEMARK OFFICE
CERTIFICATE OF CORRECTION

PATENT NO. : 5,627,804
DATED : May 6, 1997
INVENTOR(S) : Kazuyoshi Ishii

It is certified that error appears in the above-identified patent and that said Letters Patent is hereby corrected as shown below:

COLUMN 6,

Line 18, "Change" should read --change--; and
    Line 50, "orientation." should read --orientation,--.

COLUMN 14,

Line 65, "claim 22," should read --claim 21,--.

Signed and Sealed this

Sixteenth Day of December, 1997

Attest:

BRUCE LEHMAN

Attesting Officer     Commissioner of Patents and Trademarks